US 6,619,953 B2

(12) United States Patent
Yamaoka et al.

(10) Patent No.: US 6,619,953 B2
(45) Date of Patent: Sep. 16, 2003

(54) REFLOW FURNACE

(75) Inventors: Nobuyoshi Yamaoka, Kawasaki (JP); Kouichi Shimizu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/046,908

(22) Filed: Jan. 17, 2002

(65) Prior Publication Data

US 2002/0061490 A1 May 23, 2002

Related U.S. Application Data

(63) Continuation of application No. PCT/JP99/05667, filed on Oct. 14, 1999.

(51) Int. Cl.[7] .................................................. F27B 9/04
(52) U.S. Cl. ........................ 432/128; 432/145; 219/388
(58) Field of Search .......................... 432/122, 128, 432/135, 140, 145, 149; 219/388, 400, 405; 228/42, 43, 56.3, 180.22, 246; 137/615, 616

(56) References Cited

U.S. PATENT DOCUMENTS 5,405,074 A * 4/1995 Den Dopper et al. .......... 228/42
5,567,151 A * 10/1996 Mizoguchi et al. .......... 432/145
5,579,981 A * 12/1996 Matsumura et al. .......... 228/19
5,795,147 A * 8/1998 Saxena et al. .............. 432/205
6,135,344 A * 10/2000 Sakuyama et al. ....... 228/234.1

FOREIGN PATENT DOCUMENTS

| JP | 4-13475 | 1/1992 |
| JP | 6-315764 | 11/1994 |
| JP | 8-125324 | 5/1996 |

* cited by examiner

Primary Examiner—Gregory Wilson
(74) Attorney, Agent, or Firm—Armstrong, Westerman & Hattori, LLP

(57) ABSTRACT

The present invention relates to a reflow furnace for heating a carried circuit module to perform reflow soldering. The reflow furnace has a nozzle 60 for performing an operation of spraying the inert gas on a soldering portion for the circuit module carried into the furnace while the nozzle is moved, maintaining high mounting reliability and high productivity, even if apertures of the carrying inlet and the carrying outlet are large.

13 Claims, 10 Drawing Sheets

REFLOW FURNACE

This application is a continuation of International Application PCT/JP99/05667 filed Oct. 14, 1999.

TECHNICAL FIELD

The present invention relates to a reflow furnace for heating a carried circuit module to perform reflow soldering.

BACKGROUND ART

Hitherto, there is adopted a method of soldering that for example, when a circuit module is assembled onto a mother board, the circuit module, in which a soldering bump (for example, 95Pb5S$_n$ soldering and the like) is placed on a soldering portion, is disposed on the mother board, and the mother board, on which the circuit module is disposed thus, is carried into a reflow furnace which is filled with nitrogen and is maintained a temperature 500° C. or more so that a reflow soldering is performed. In this case, it often happens that there is provided such an arrangement that the mother board and the circuit module on the mother board are conveyed by a conveyance belt into a reflow furnace and are carried out from the reflow furnace as they are on the conveyance belt. In such a case, it is needed for the reflow furnace to have a carrying inlet for carrying the circuit module and the like into the reflow furnace and a carrying outlet for carrying the circuit module and the like out. In the middle of reflow soldering, exposure to oxygen makes it easy to bring about oxidation. This involves a degradation of reliability in mounting. Accordingly, in order that oxygen is hard to enter inside of the reflow furnace, height of apertures of the carrying inlet and the carrying outlet is limited to the order of 1 cm to 2 cm or so which permits a circuit module mounted with no fin to barely pass through the apertures.

On the contrary, recently, in order to increase the productivity, there is increased such a demand that an extremely high circuit module is carried into a reflow furnace to perform a reflow soldering in such a way that the assembled circuit module, on which a heat sink fin is already mounted, is mounted on a mother board. To carry the circuit module, on which a heat sink fin is mounted, into the reflow furnace and carry out the same, there is needed carrying inlet and carrying outlet of the aperture height of 5 cm to 10 cm or so. In this case, simply enlarging the aperture makes air (oxygen in air) easy to enter inside the reflow furnace owing to diffusion or the like. This involves a possibility of degradation of reliability in mounting.

This problem will be described in conjunction with drawings.

Figure 10:
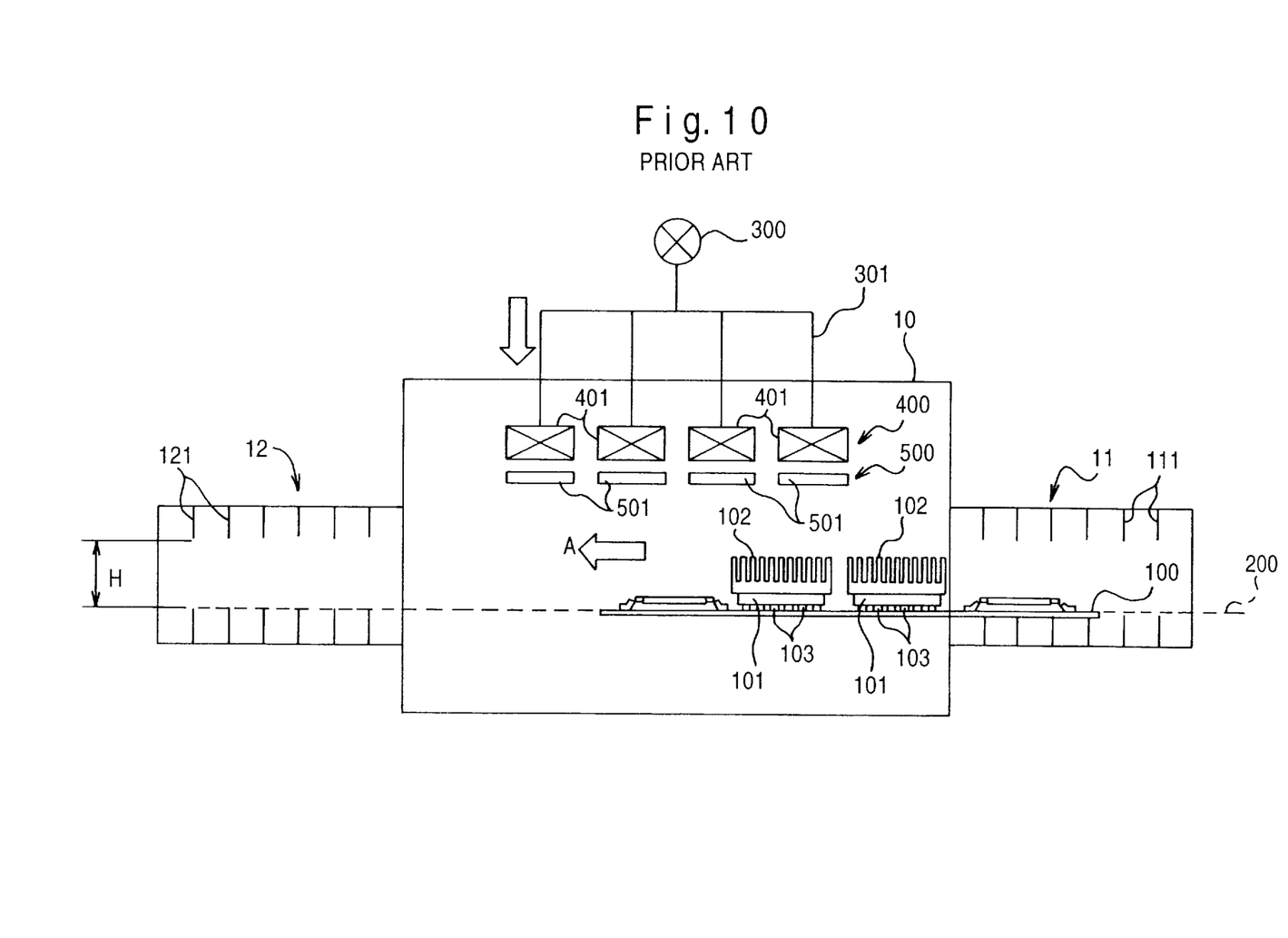
FIG. 10 is a typical illustration of the conventional reflow furnace.

FIG. 10 is a typical illustration of a reflow furnace.

FIG. 10 shows a state that a circuit module 101, on which a heat sink fin 102 is already mounted, is put on a mother board 100 through a soldering bump 103. The mother board 100 in this state is put on a conveyance belt 200 travelling in an arrow A direction and is conveyed into a box-like shaped furnace 10.

The box-like shaped furnace 10 comprises a carrying inlet 11 for carrying the mother board 100 (including the circuit modules 101 and the like) into the furnace and a carrying outlet 12 for carrying the mother board 100 out of the furnace.

The furnace 10 has a nitrogen gas supplying section 400 for supplying into the furnace nitrogen gas supplied from a nitrogen gas supplying source 300 via a gas supplying path 301. The nitrogen gas supplying section 400 is provided with a fan 401. The nitrogen gas supplied via the gas supplying path 301 is sent out by the fan 401 into the furnace. The nitrogen gas supplied sent out into the furnace fills the furnace and flows out of the furnace via the carrying inlet 11 and the carrying outlet 12.

Further furnace 10 has a heater 500 in which infrared panel heaters 501 are arranged. The infrared panel heater 501 is a heat source for performing a reflow soldering, and heats the carried mother board 100 (including the circuit modules 101 and the like) to melt the soldering bump 103.

The carrying inlet 11 and the carrying outlet 12 are provided with a fin 111 and a fin 121 on their inside walls, respectively. Those fins 111 and 121 are for preventing oxygen in air from entering from outside of a furnace in some extent.

Figure 11:
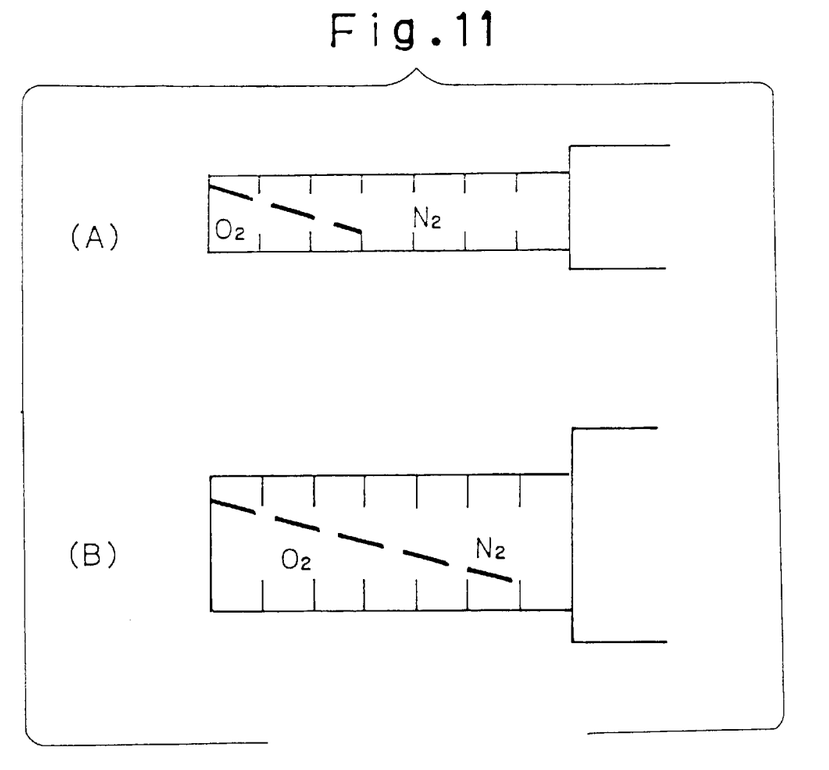
FIG. 11 is a typical illustration showing a relation between height (H shown in FIG. 10) of an aperture of the carrying inlet or the carrying outlet and a state of entering of the oxygen in air.

FIG. 11 is a typical illustration showing a relation between height (H shown in FIG. 10) of an aperture of the carrying inlet or the carrying outlet and a state of entering of the oxygen in air.

FIG. 11(A) shows a case where height H of an aperture is narrow. FIG. 11(B) shows a case where height H of an aperture is wide.

Since oxygen $O_2$ is heavier than Nitrogen $N_2$, oxygen $O_2$ enters a furnace in such a manner that oxygen $O_2$ gets under Nitrogen $N_2$. As compared with a case where height H of an aperture is narrow (FIG. 11(A)), a case where height H of an aperture is wide (FIG. 11(B)) is associated with extremely higher possibility that oxygen $O_2$ enters up to the position nearer to the inside of the main frame of the furnace owing to disturbances of flow of oxygen gas in carrying in and carrying out for the mother board 100 and the like.

As measures of preventing oxygen from entering from the carrying inlet and the carrying outlet, there is considered an adoption of a shutter for selectively covering the carrying inlet and the carrying outlet. In this case, however, when the shutter opens to carry a circuit module into a reflow furnace, air (oxygen) enters the reflow furnace. Thus, there is a need to control a temperature of the reflow furnace in such a manner that a reflow soldering is performed waiting for going down of oxygen density of the reflow furnace. Thus, it takes a lot of time for the reflow soldering and there is a possibility that this will involve a degradation of productivity.

DISCLOSURE OF THE INVENTION

In view of the foregoing, it is an object of the present invention to provide a reflow furnace capable of performing reflow soldering which is high in productivity, while a mounting reliability is maintained high level, even if a height of the aperture of the carrying inlet and the carrying outlet is extensive.

To achieve the above-mentioned object, the present invention provides a first reflow furnace comprising:

a case member having a carrying inlet into which a circuit module is carried and a carrying outlet from which the circuit module is carried out;

a gas supplying section for supplying an inert gas into said case member;

a heating section for heating the circuit module carried into said case member to perform a reflow soldering; and a nozzle for performing an operation of spraying the inert gas on a soldering portion for the circuit module carried into the case member while said nozzle is moved.

According to the first reflow furnace, there is provided the nozzle as mentioned above. Thus, even if oxygen somewhat enters the furnace from the carrying inlet or the carrying outlet to somewhat increase the oxygen density, so that the oxygen is accumulated on a soldering portion, the accumulated oxygen is blown away by an inert gas ejected from the nozzle so that the reflow soldering is performed in an atmosphere that no oxygen exists. Thus, according to the first reflow furnace; it is possible to implement a high reliability of mounting.

In the first reflow furnace according to the present invention as mentioned above, it is preferable that the first reflow furnace further comprises a sensor for measuring an oxygen density, and said nozzle is selectively operable between emission of the inert gas and stop of the inert gas, and performs said operation when the oxygen density measured by said sensor exceeds a predetermined allowance value.

In this manner, the oxygen density is measured, and the nozzle is operated only in the necessary case in accordance with the measured result. This feature makes it possible to prevent the inert gas from being used to no purpose and also to avoid waste for time necessary for blowing oxygen away.

To achieve the above-mentioned object, the present invention provides a second reflow furnace comprising:

a case member having a carrying inlet into which a circuit module is carried and a carrying outlet from which the circuit module is carried out;

a gas supplying section for supplying an inert gas into said case member;

a heating section for heating the circuit module carried into said case member to perform a reflow soldering; and fans for sending inert gas inside said case member from the inside of said case member toward the carrying inlet and the carrying outlet, respectively.

According to the second reflow furnace of the present invention as mentioned above, there are provided the above-mentioned fans. This feature makes it possible to avoid mixing of the air (oxygen) from out of the furnace and thereby performing a high reliability of mounting even if an aperture of the carrying inlet and the carrying outlet is large. Here, it is considered that nozzles from which inert gas is jetted via the carrying inlet or the carrying outlet to out of the furnace replace the above-mentioned fans. However, in this case, the inert gas, which is unused in the furnace, is used only for blow off from the carrying inlet or the carrying outlet. This makes it easy to increase an amount of use of inert gas, and thus easy to be a cause of rising the cost of mounting. To the contrary, according to the second reflow furnace of the present invention, the inert gas filled once in the furnace is sent out by the fans. In other words, the inert gas used for removal of oxygen and the like in the furnace is utilized again. Thus, according to the present invention, it is possible to maintain a high reliability of mounting, while suppressing a degree of increment of the total amount of inert gas.

In the second reflow furnace according to the present invention as mentioned above, it is preferable that the second reflow furnace further comprises a sensor for measuring an oxygen density, and each of said fans is selectively operable between air sending of the inert gas and air sending stop of the inert gas, and performs an air sending operation when the oxygen density measured by said sensor exceeds a predetermined allowance value.

Performing air sending only at the necessary time makes it possible to suppress an increment of the amount of use of the inert gas.

In either of the first reflow furnace of the present invention and the second reflow furnace of the present invention, it is preferable that said gas supplying section supplies nitrogen gas as the inert gas into said case member.

As mentioned above, according to the present invention, it is possible to maintain high mounting reliability and high productivity, even if apertures of the carrying inlet and the carrying outlet are large.

BEST MODE FOR CARRYING OUT THE INVENTION

Embodiments of the present invention will be described hereinafter.

Figure 1:
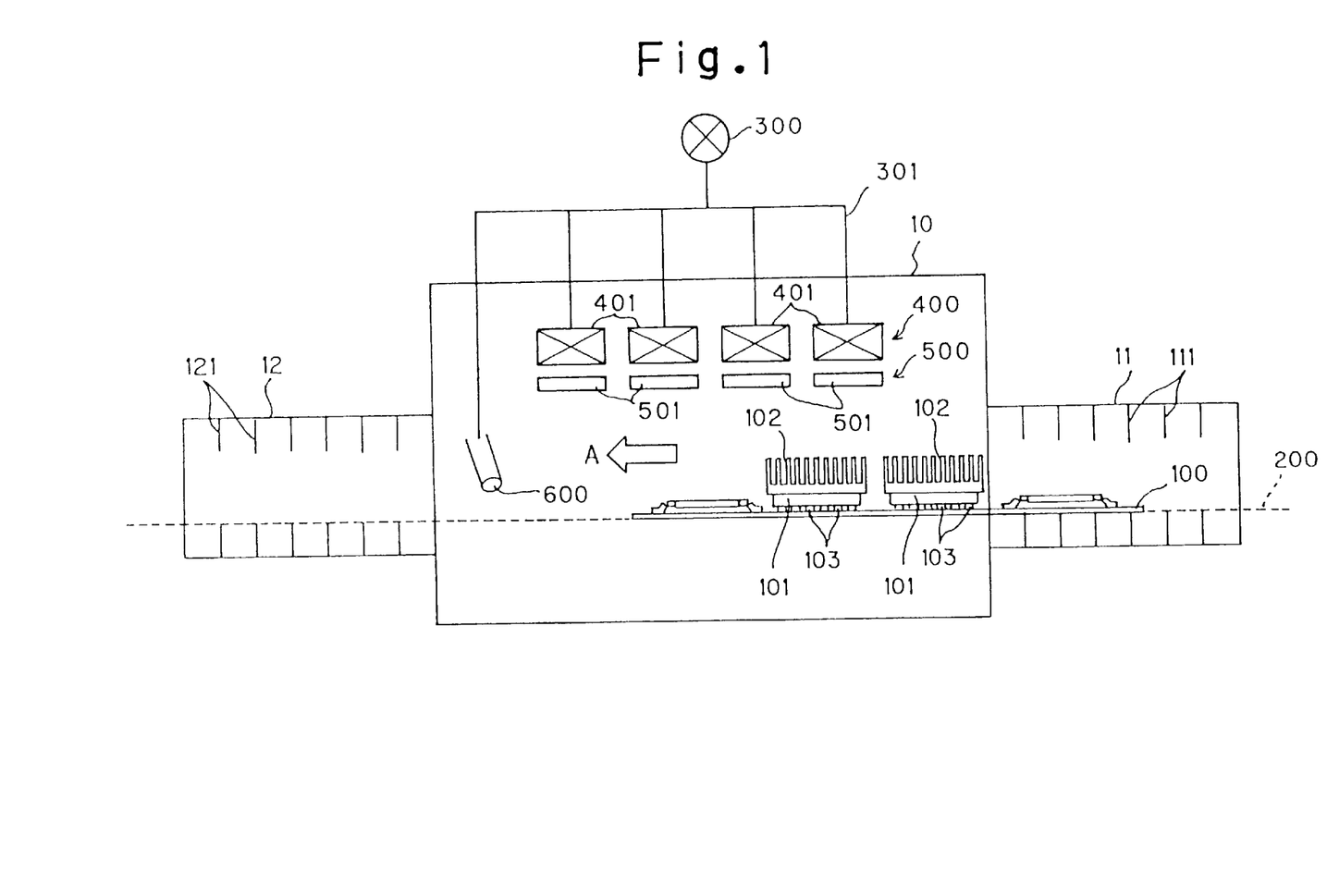
FIG. 1 is a typical illustration of a first embodiment of a reflow furnace of the present invention.

FIG. 1 is a typical illustration of a first embodiment of a reflow furnace of the present invention. In FIG. 1 to FIG. 9, the same reference numbers as those of FIG. 10 denotes the same parts, and there will be explained mainly the difference points.

Figure 2:
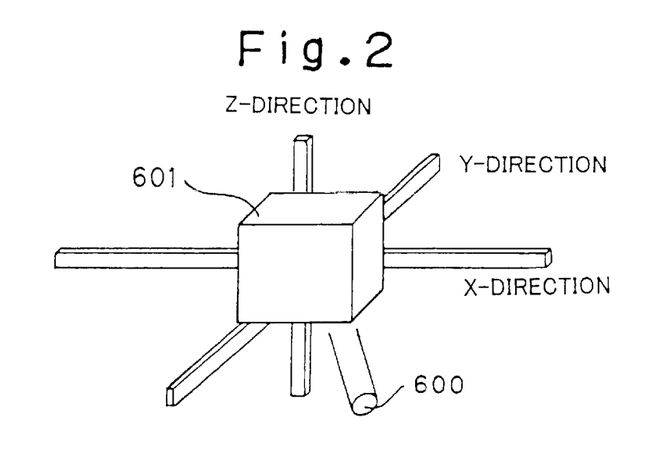
FIG. 2 is a typical illustration of a nozzle driving mechanism.

In FIG. 1, as compared with the structure of the reflow furnace shown in FIG. 10, a reflow furnace further comprises a nozzle 600 connected to a gas supplying path 301. The nozzle 600 is connected, as shown in FIG. 2, to a traverse mechanism 601 which can freely travel in an x-direction, a y-direction and a z-direction, so that the nozzle 600 can move in a vertical direction (the z-direction), a horizontal direction (the x-direction) and a front and behind direction (the y-direction).

Figure 3:
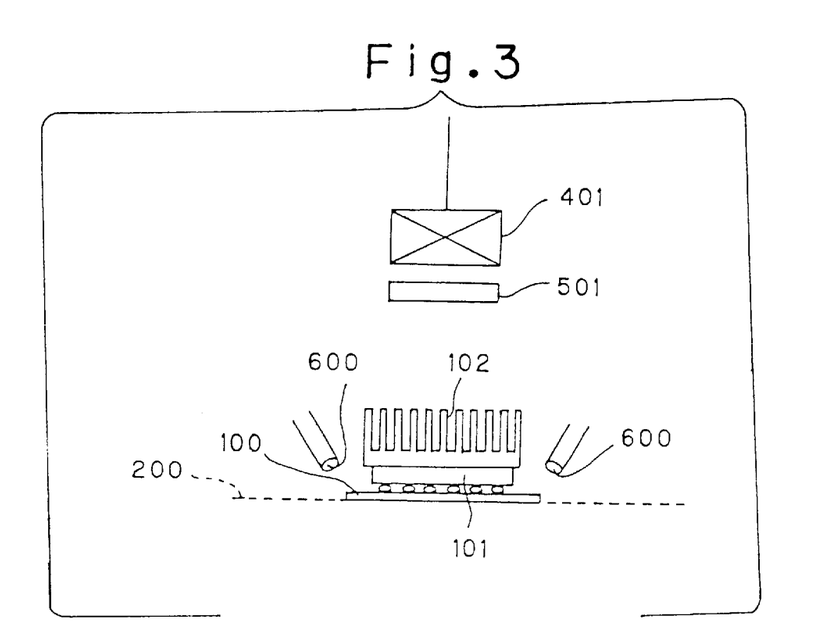
FIG. 3 is a view in which a part of the reflow furnace shown in FIG. 1 is observed in a conveying direction of a mother board.

FIG. 3 is a view in which a part of the reflow furnace shown in FIG. 1 is observed in a conveying direction of the mother board 100.

FIG. 3 shows two nozzles 600 between which the circuit block 101 is interposed. In this manner, in the embodiment shown in FIG. 1, it is acceptable that the reflow furnace is provided with a plurality of nozzles 600. In the event that there is provided a plurality of nozzles 600, when it is permitted that the relative position of those nozzles 600 is constant, it is acceptable that those nozzles 600 are coupled with the common traverse mechanism 601 (cf. FIG. 2), or alternatively it is also acceptable that those nozzles 600 are coupled with the associated traverse mechanisms, respectively, for a wide use.

Figure 4:
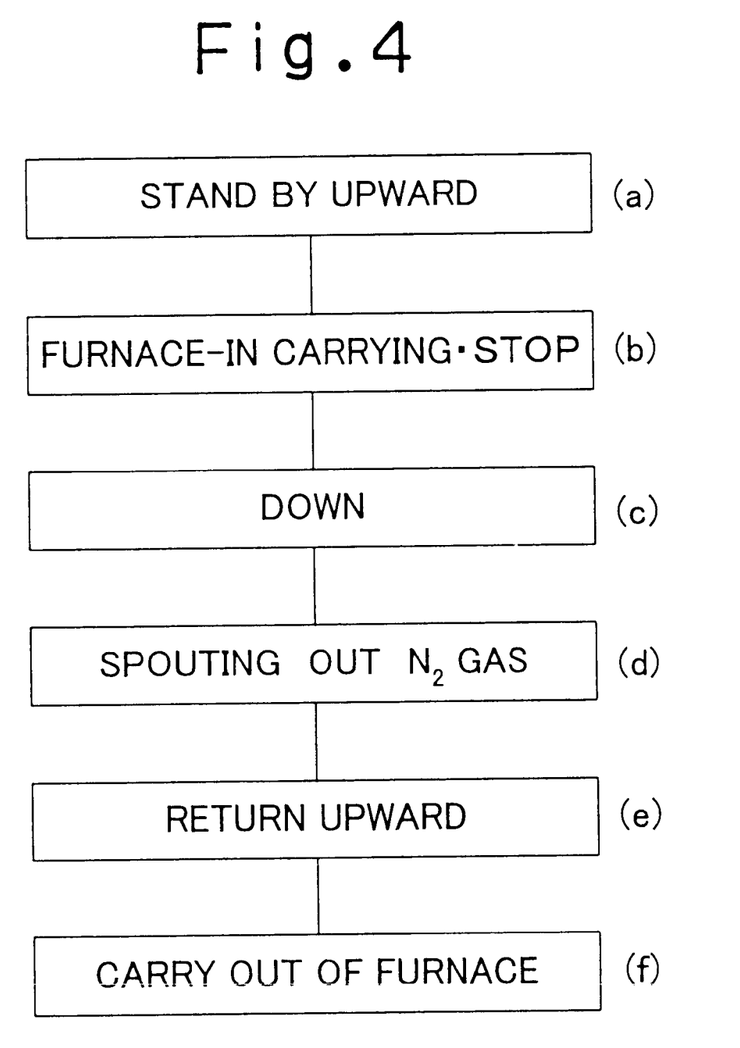
FIG. 4 is a flowchart useful for understanding an operating sequence of the reflow furnace shown in FIG. 1.

FIG. 4 is a flowchart useful for understanding an operating sequence of the reflow furnace shown in FIG. 1.

First, the nozzle 600 stands by upward so as not to be obstructive to the conveyance of the mother board 100 and the circuit module 101 disposed on the mother board 100 (a step (a)). In this state, the use of the conveyance belt 200 carries the mother board 100 and the like into the furnace and stops the same in the furnace (a step (b)). Next, the nozzle 600 goes down (a step (c)), so that nitrogen gas spouts through the gap of the circuit module 101 (a step (d)). Thus, oxygen, which is heavier than nitrogen and sinks below, is ejected, so that a reflow soldering is performed under environment in which no oxygen exists. Thereafter, the nozzle 600 returns upward (a step (e)), so that the mother board 100 and the like is carried out of the furnace.

Figure 5:
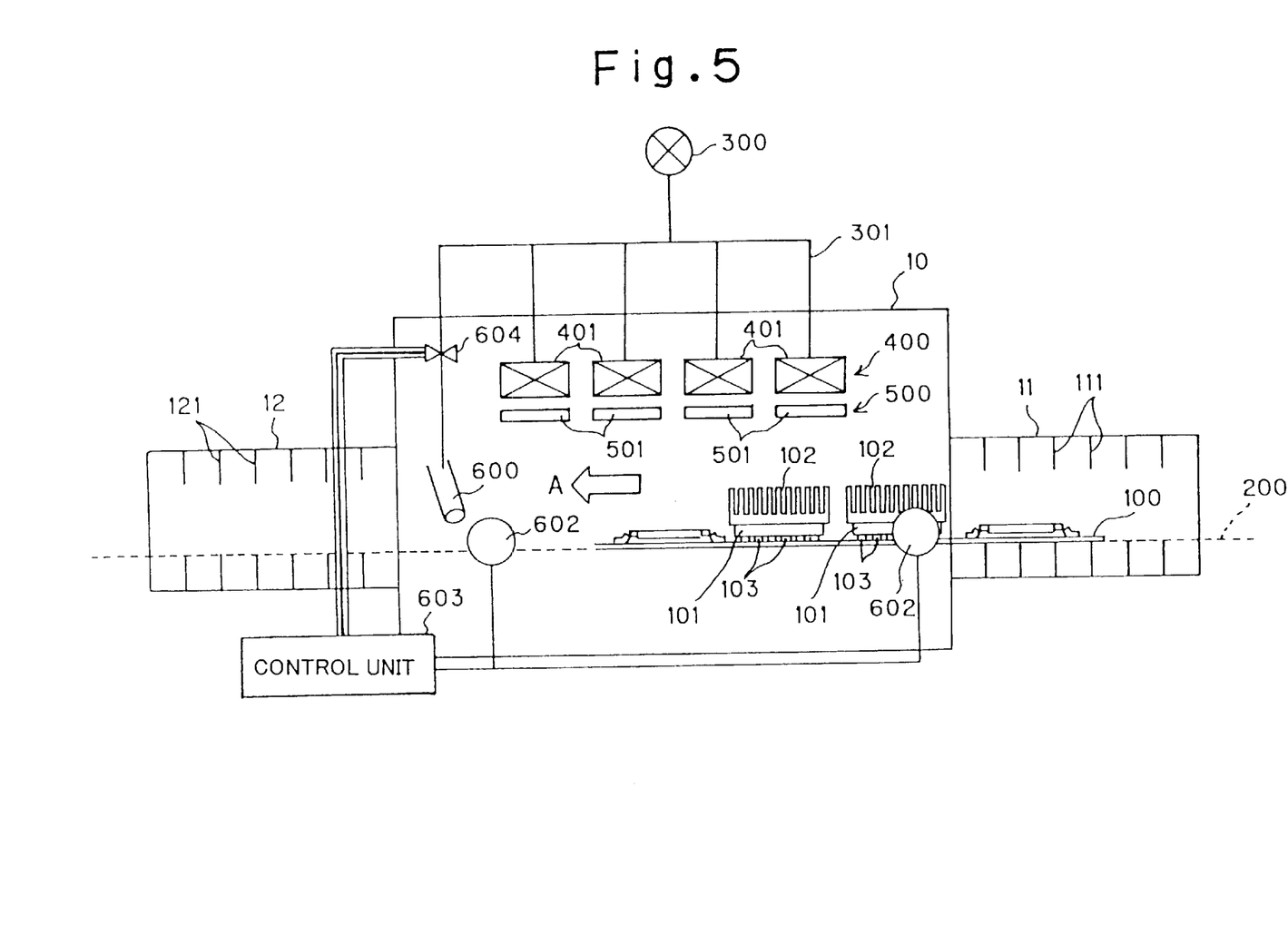
FIG. 5 is a typical illustration of a second embodiment of a reflow furnace of the present invention.

FIG. 5 is a typical illustration of a second embodiment of a reflow furnace of the present invention. There will be explained difference points from the first embodiment shown in FIG. 1 (a step (f)).

In the vicinity of the carrying inlet 11 and the carrying outlet 12 in the furnace there are disposed oxygen density sensors 602 for measuring oxygen density in the furnace. Further, there is provided a valve 604 in halfway to the nozzle 600 on the gas supplying path 301. Furthermore, there is provided control unit 603 for providing such a control that when the oxygen density in the furnace exceeds a predetermined allowance in accordance with the oxygen density measured by the oxygen density sensors 602, the valve 604 is opened to eject nitrogen gas from the nozzle 600 and causes the nozzle 600 to perform the above mentioned operation.

Figure 6:
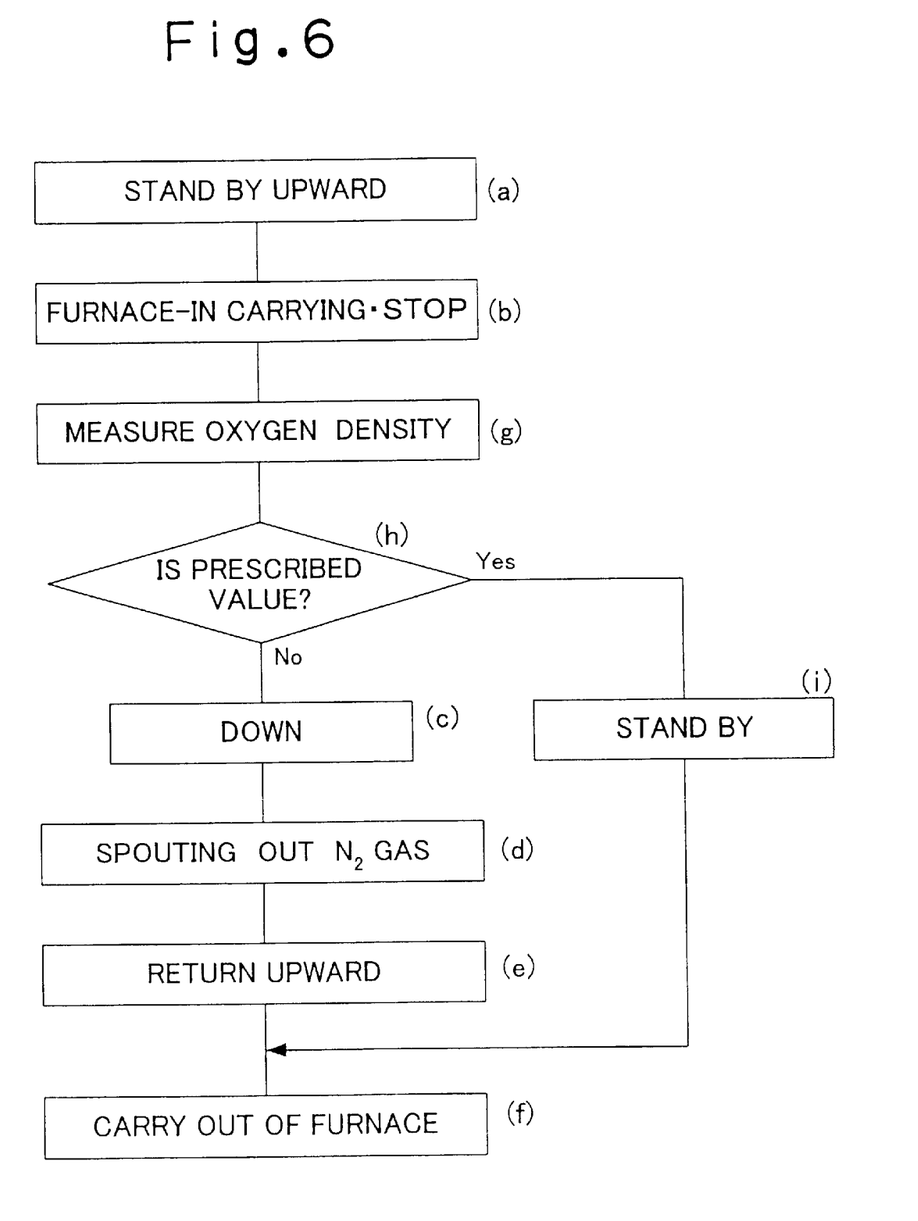
FIG. 6 is a flowchart useful for understanding an operating sequence of the reflow furnace shown in FIG. 5.

FIG. 6 is a flowchart useful for understanding an operating sequence of the reflow furnace shown in FIG. 5.

In FIG. 6, the same reference numbers as those of FIG. 4 denotes the same parts. And there will be explained only the different points.

When the mother board 100 and the like are carried into the furnace and stopped (a step (b)), the oxygen density sensors 602 measures oxygen density in the furnace, and the control unit 603 decides whether the measured value is within the prescribed value (a step (b)). When it is decided that the measured value is within the prescribed value, it is waited until the soldering bump 103 is completely dissolved (a step (i)), and thereafter, the mother board 100 and the like is carried out of the furnace (a step (f)). On the other hand, when the measured value of the oxygen density exceeds the prescribed value, as explained referring to FIG. 4, oxygen is blown away by nitrogen gas jetted out from the nozzle 600 (steps (c) to (e)), and thereafter the mother board 100 and the like is carried out of the furnace.

Figure 7:
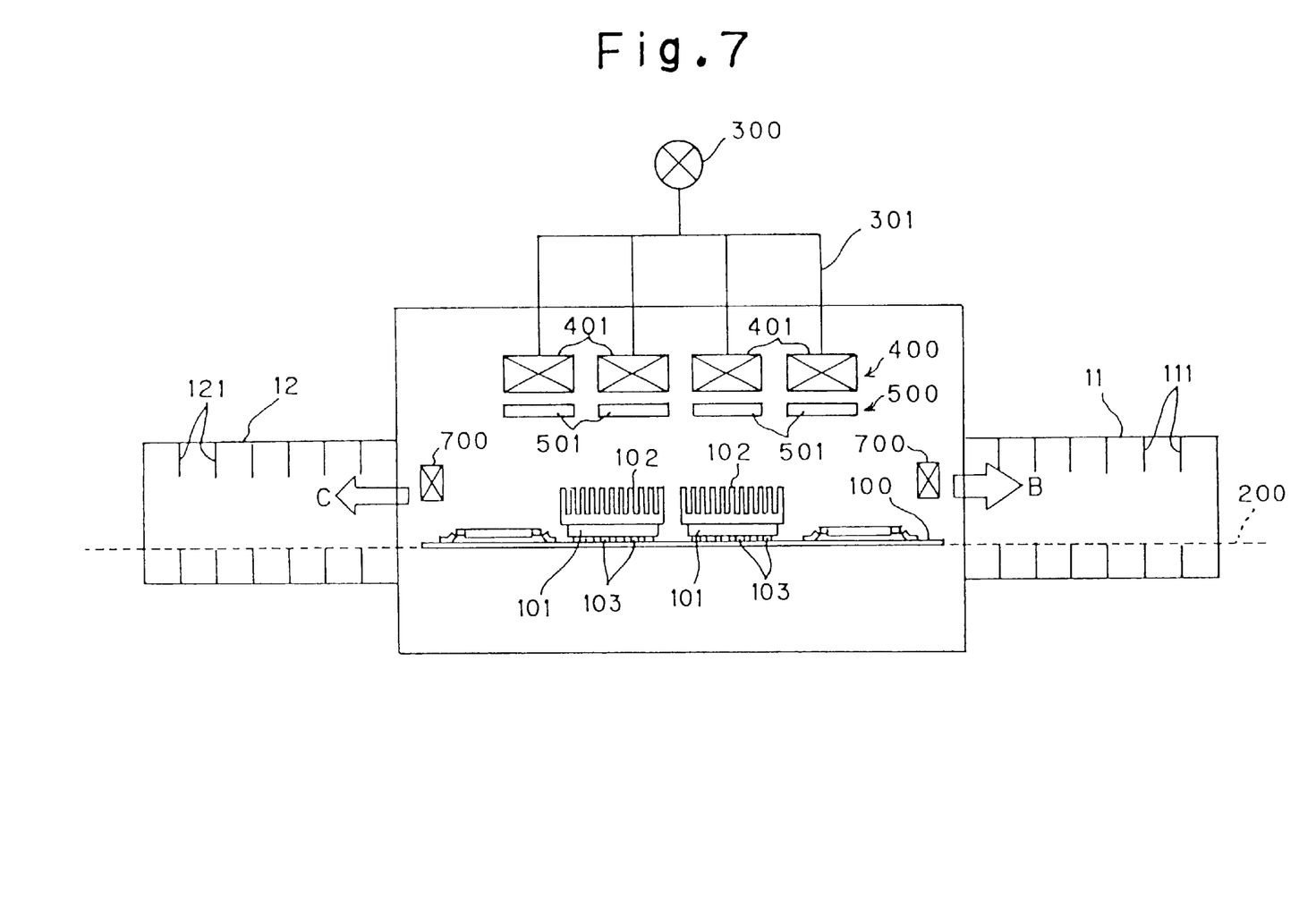
FIG. 7 is a typical illustration of a third embodiment of a reflow furnace of the present invention.

FIG. 7 is a typical illustration of a third embodiment of a reflow furnace of the present invention.

In the present embodiment, as compared with the reflow furnace shown in FIG. 10, there are provided auxiliary fans 700 in the vicinity of the carrying inlet 11 and the carrying outlet 12 of the furnace. Of those auxiliary fans 700, the auxiliary fan 700 disposed in the vicinity of the carrying inlet 11 ventilates nitrogen gas of the furnace from the furnace to the carrying inlet (in an arrow B direction). And the auxiliary fan 700 disposed in the vicinity of the carrying inlet 12 ventilates nitrogen gas of the furnace from the furnace to the carrying outlet (in an arrow C direction).

Thus, the use of the auxiliary fans for ventilating the gas from the furnace to the carrying inlet and the carrying outlet may push oxygen of the outside of furnace, which is diffused toward the inside of the furnace, backward out of the furnace, so that the inside of the furnace can be maintained low in the condition of oxygen density.

Figure 8:
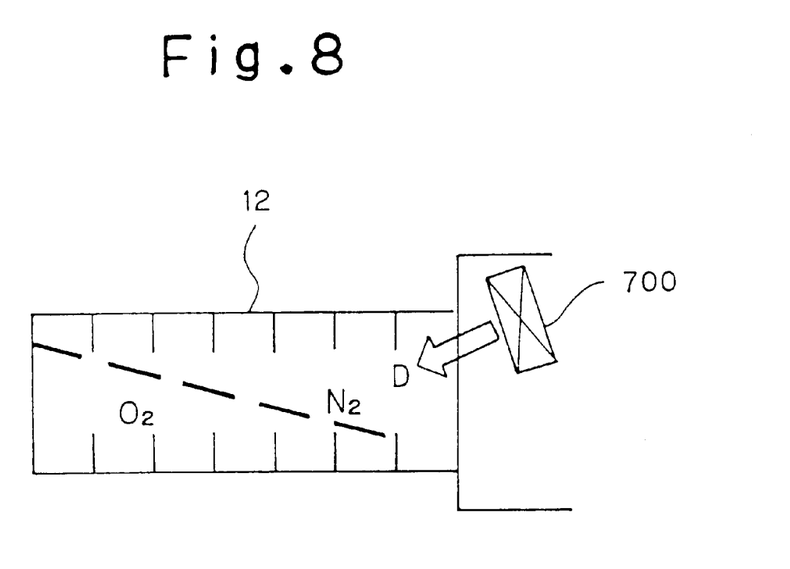
FIG. 8 is a view showing a part of a modification of the third embodiment shown in FIG. 7.

FIG. 8 is a view showing a part of a modification of the third embodiment shown in FIG. 7. According to the present invention, the auxiliary fan 700 is directed obliquely downward so that air is sent in an arrow direction D directed obliquely downward. This arrangement makes it possible to more effectively push back oxygen $O_2$, which is diffused in such a manner that oxygen $O_2$ dives under nitrogen $N_2$. While FIG. 8 shows the carrying outlet 12, this is similar as to the carrying inlet 11 too.

Figure 9:
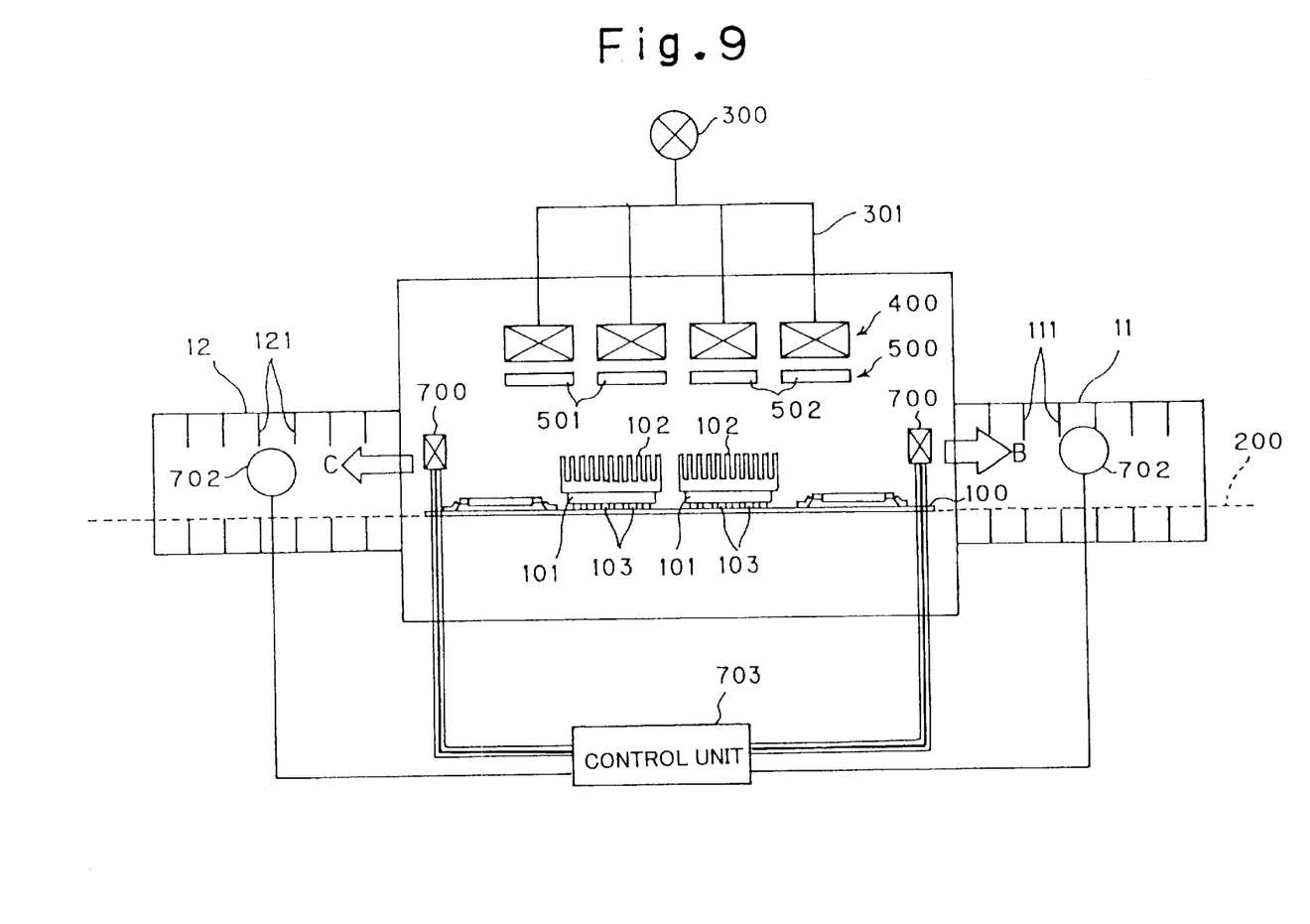
FIG. 9 is a typical illustration of a fourth embodiment of a reflow furnace of the present invention.

FIG. 9 is a typical illustration of a fourth embodiment of a reflow furnace of the present invention.

Here, there will be explained difference points from the third embodiment.

According to the present invention, there are disposed oxygen density sensors 702 on the carrying inlet 11 and the carrying outlet 12. Those oxygen density sensors 702 measure oxygen density on the carrying inlet 11 and the carrying outlet 12. The measure results are fed to the control unit 703. The control unit 703 provides such a control that when the measured value of the oxygen density on the carrying inlet 11 exceeds the prescribed value, the auxiliary fan 700 on the carrying inlet 11 side is operated to send air, and when the measured value of the oxygen density on the carrying outlet 12 exceeds the prescribed value, the auxiliary fan 700 on the carrying outlet 12 side is operated to send air. Incidentally, it is acceptable that a control that two auxiliary fans 700 are individually controlled in turn-on and turn-off is replaced by a control that when either one of the two oxygen density sensors 702 exceeds the prescribed value, sending of air is simultaneously performed.

In this manner, sending of air only when the oxygen density is enhanced, but not always sending air by the auxiliary fans 700, makes it possible to reduce an amount of consumption of nitrogen.

Incidentally, according to the above-mentioned various types of embodiment, the furnace is filled with nitrogen gas, however, it is acceptable that an inert gas other than nitrogen gas is adopted.

What is claimed is:

1. A reflow furnace comprising:
    a case member having a carrying inlet into which a circuit module is carried and a carrying outlet from which the circuit module is carried out;
    a gas supplying section for supplying an inert gas into said case member;
    a heating section for heating the circuit module carried into said case member to perform a reflow soldering; and
    a freely traveling nozzle for performing an operation of spraying the inert gas on a soldering portion for the circuit module carried into the case member.

2. A reflow furnace according to claim 1, further comprising a sensor for measuring an oxygen density,
    wherein said nozzle is selectively operable between emission of the inert gas and stop of the inert gas, and performs said operation when the oxygen density measured by said sensor exceeds a predetermined allowance value.

3. The reflow furnace of claim 1, wherein the freely traveling nozzle can freely travel in an x-direction; a y-direction and a z-direction.

4. The reflow furnace of claim 1, wherein the freely traveling nozzle can move down when the circuit module is near the nozzle and can move up when the circuit module is far from the nozzle.

5. The reflow furnace of claim 1, wherein the furnace has a plurality of nozzles.

6. The reflow furnace of claim 5, wherein the plurality of nozzles are coupled with a common transverse mechanism.

7. The reflow furnace of claim 5, wherein the plurality of nozzles are coupled with an associated traverse mechanism for wide use.

8. The reflow furnace of claim 3, wherein the fans are connected to a control unit so that the fans can be operated based on a measured value of oxygen density inside the furnace.

9. The reflow furnace of claim 1, wherein the nozzle is coupled with a common transverse mechanism.

10. The reflow furnace of claim 1, where in the nozzle is coupled with an associated traverse mechanism for wide use.

11. A reflow furnace comprising:

a case member having a carrying inlet into which a circuit module is carried and a carrying outlet from which the circuit module is carried out;

a gas supplying section for supplying an inert gas into said case member;

a heating section for heating the circuit module carried into said case member to perform a reflow soldering; and fans located in front of the carrying inlet and the carrying outlet for sending inert gas inside said case member from the inside of said case member toward the carrying inlet and the carrying outlet, respectively, so that oxygen can be pushed to the outside of the furnace and the inside of the furnace can be maintained with a low oxygen density.

12. A reflow furnace according to claim 11, further comprising a sensor for measuring an oxygen density, wherein each of said fans is selectively operable between air sending of the inert gas and air sending stop of the inert gas, and performs an air sending operation when the oxygen density measured by said sensor exceeds a predetermined allowance value.

13. A reflow furnace according to claim 1 or 11 wherein said gas supplying section supplies nitrogen gas as the inert gas into said case member.

* * * * *